(12) United States Patent
Relyea et al.

(10) Patent No.: US 7,464,329 B2
(45) Date of Patent: *Dec. 9, 2008

(54) DECLARATIVE MECHANISM FOR DEFINING A HIERARCHY OF OBJECTS

(75) Inventors: Robert A. Relyea, Bellevue, WA (US); Roger Grambihler, Woodinville, WA (US); Jeff Bogdan, Redmond, WA (US); Joseph King, Seattle, WA (US); Chris Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/351,649

(22) Filed: Feb. 10, 2006

(65) Prior Publication Data
US 2006/0129920 A1 Jun. 15, 2006

Related U.S. Application Data

(62) Division of application No. 10/439,505, filed on May 16, 2003.

(51) Int. Cl.
*G06F 17/00* (2006.01)
(52) U.S. Cl. .................. 715/234; 715/237; 715/239; 715/236; 704/1; 717/100; 709/236
(58) Field of Classification Search ................ 715/513, 715/530, 845, 234–239; 704/1; 709/203; 717/100
See application file for complete search history.

(56) References Cited

U.S. PATENT DOCUMENTS

| 5,459,837 | A | 10/1995 | Caccavale |
| 6,085,243 | A | 7/2000 | Fletcher et al. |
| 6,327,620 | B1 | 12/2001 | Tams et al. |
| 6,366,934 | B1 | 4/2002 | Cheng et al. |
| 6,493,756 | B1 | 12/2002 | O'Brien et al. |
| 6,516,322 | B1 | 2/2003 | Meredith |
| 6,615,261 | B1 | 9/2003 | Smørgrav |
| 2002/0010700 | A1 | 1/2002 | Wotring et al. |
| 2003/0074181 | A1* | 4/2003 | Gharavy ................. 704/1 |

OTHER PUBLICATIONS

W3C XSL Transformation (XSLT) Nov. 16, 1999 at http://www.w3.org/TR/1999/REC-xslt-19991116#base-uri pp. 1-95.*
Extensible Markup Language (XNL) 1.0 (Second Edition) W3C Recommendation Oct. 6, 2000, 63 pages.
International Search Report, mailed Oct. 10, 2003, 3 pages.

* cited by examiner

*Primary Examiner*—Doug Hutton
*Assistant Examiner*—Quoc A Tran
(74) *Attorney, Agent, or Firm*—Merchant & Gould

(57) ABSTRACT

Described is a method and data structure that enables an object to be specified declaratively within a markup document. The markup document may be XML-based. In accordance with the invention, the object is written based on a mapping. The mapping includes a URL attribute for defining a location for a definition file having assemblies and namespaces where classes are specified. The class name is mapped to the markup document as a tag name. Properties and events of a class are mapped to attributes of the tag associated with the class. The method further includes a method to parse the markup language to create a hierarchy of objects. Attributes that do not map directly to a class are defined with a definition tag. The definition tag is also used to add programming code to a page.

5 Claims, 3 Drawing Sheets

DECLARATIVE MECHANISM FOR DEFINING A HIERARCHY OF OBJECTS

CROSS-REFERENCE TO RELATED APPLICATIONS

This patent application is a divisional of U.S. patent application Ser. No. 10/439,505, entitled "DECLARATIVE MECHANISM FOR DEFINING A HIERARCHY OF OBJECTS," filed on May 16, 2003 and assigned to the same assignee as this application. The aforementioned patent application is expressly incorporated herein by reference.

FIELD OF THE INVENTION

This invention relates generally to computer systems and, more particularly, relates to a method and system to declaratively create hierarchies of objects and object types.

BACKGROUND OF THE INVENTION

Markup languages are generally easy to create and understand. The Extensible Markup Language, commonly known as XML, is one of the most prevalent markup languages in use today. XML is a format designed to bring structured information to the Web. It is a Web-based language for electronic data interchange. XML is an open technology standard of the World Wide Web Consortium (W3C), which is the standards group responsible for maintaining and advancing the hypertext markup language (HTML) and other Web-related standards.

XML is a sub-set of the Standard Generalized Markup Language (SGML) that maintains the important architectural aspects of contextual separation while removing nonessential features. The XML document format embeds the content within tags that express its structure. XML also provides the ability to express rules for the grammar of a document. These two features allow automatic separation of data and metadata, and allow generic tools to validate an XML document against its grammar.

XML has been designed for system integration. XML provides a structural representation of data that has proved broadly implementable and easy to deploy. A piece of information marked by the presence of tags is called an element. Matching start and end tags are used to mark up information. Elements can be further described by attaching name value pairs called attributes. An XML element can declare its associated data to be any desired data element. For example, the element can be a retail price, a book title, etc. Presently, XML has been applied to grammar-based representations of applications data (e.g., business documents, ED1 messages, etc.), user-interfaces of applications, XHTML, and other grammars having a fixed set of tags.

These grammar-based representations are limited in that they do not have the ability to easily extend the fixed set of tags to create new types of XML elements. Additionally, as the computer industry steadily moves towards object-oriented programming, XML does not adequately represent objects of executable components. These objects are re-usable by other software programs and new objects can be easily extended from existing objects. As a result, programmers often create hierarchies of objects programmatically in a programming language instead of declaratively. The hierarchy of objects has to be created in the programming language every time it is used.

A system to provide programmers with the ability to create hierarchies of objects and types declaratively in conjunction with programmatic logic has eluded those skilled in the art.

BRIEF SUMMARY OF THE INVENTION

The invention is directed to a mechanism for defining hierarchies of objects declaratively in a markup language. These objects include objects such as common language runtime types of the Microsoft.NET framework. Traditional methods of implementing items such as user interfaces require that the item be created synchronously. For very large items, the time to load the item can be time constrictive. The invention provides users the ability to either synchronously or asynchronously create objects in a hierarchy (i.e., a tree).

The markup language is XML-based. The object is written in the markup language based on a mapping. The mapping includes a URL attribute for defining a location for a definition file having assemblies and namespaces where object classes are specified. The tag name in the markup language is mapped to a class name. Attributes of a tag are mapped to properties and events of a class associated with the tag. Attributes that do not map directly to a class are defined with a definition tag. The definition tag is also used to add programming code to a page.

The invention further includes a method to parse the markup language to create a hierarchy of objects. The definition file is used to determine where the object class is located for the mechanism of the invention to search for classes in which a tag is mapped. Once a class is determined, the attribute name is searched in the property section and event section of the class. An instance of an object of the class is created. Attributes may be specified using compound properties.

The invention provides the capability for items such as user interfaces, vector graphic drawings, and documents to be created synchronously or asynchronously using the markup language. The documents include fixed-format documents and adaptive-flow documents. The fixed-format documents are documents that explicitly define in a device independent manner the number of pages and the placement of objects on each page. Adaptive-flow documents are documents that can be automatically repaginated, repositioning objects on each page, whenever the page size is changed.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
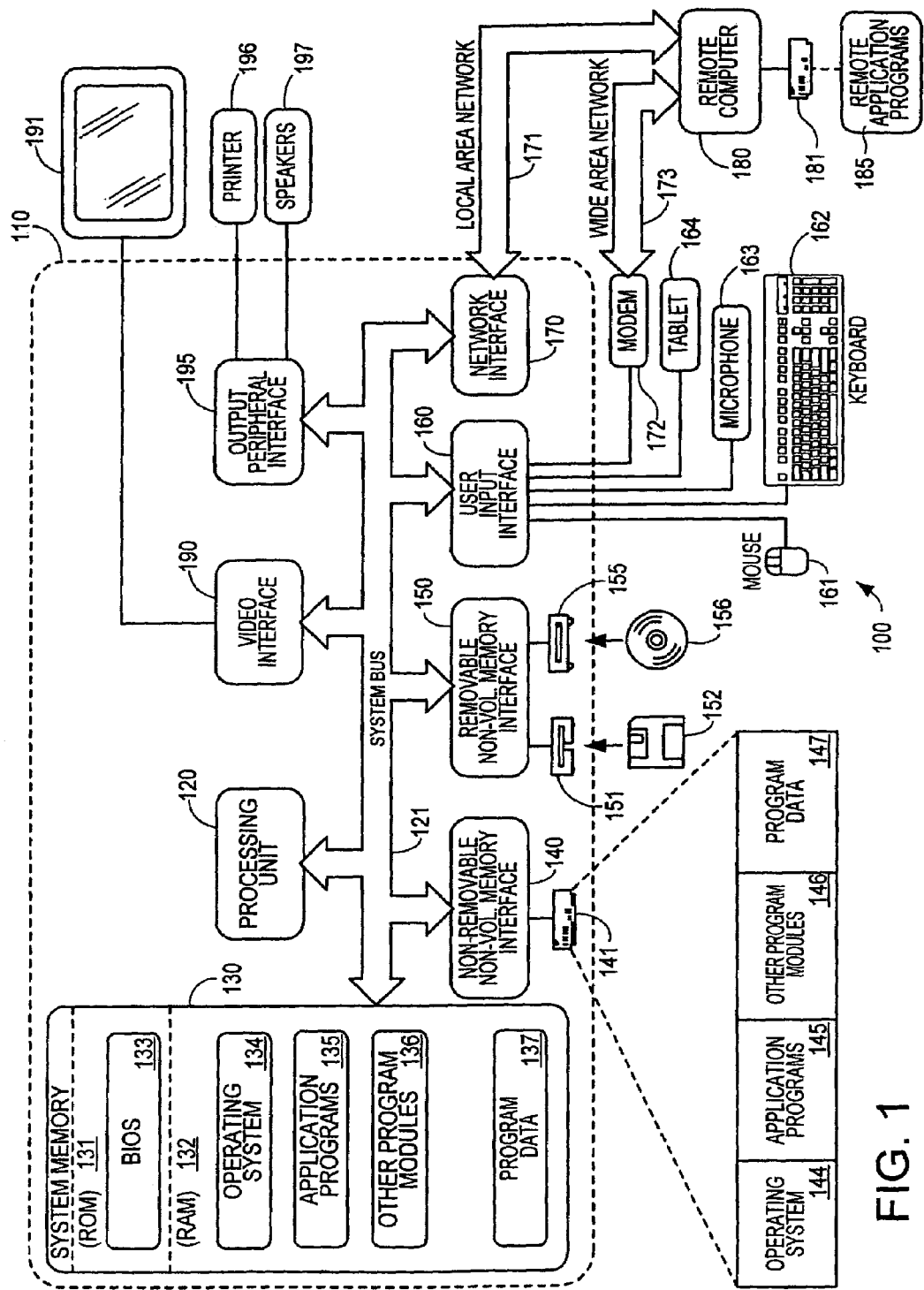
FIG. 1 is a block diagram generally illustrating an exemplary computer system on which the present invention resides.

The invention provides a mechanism that allows a user to specify a hierarchy of objects and the programmatic logic behind the hierarchy of objects with an XML based markup language. This provides the ability for an object model to be described in XML. One result is that the extensible classes such as classes in the Common Language Runtime (CLR) of the .NET Framework by Microsoft Corporation can be accessed in XML. The number of classes in CLR is continuously growing, which means that the XML representation of object models is dynamically growing. As described herein, the mechanism provides a direct mapping of XML tags to CLR objects and the ability to represent related code in the markup. The mechanism can be used to create fixed-format documents, adaptive-flow documents, vector graphic drawings, application user interfaces and controls, and the like in XML markups and any combination of the foregoing.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a Distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
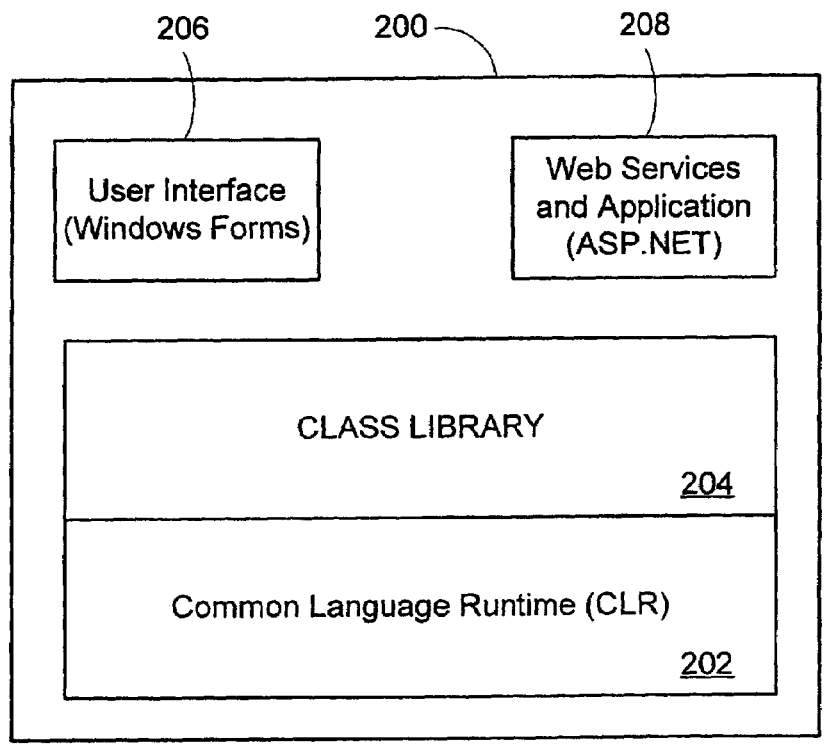
FIG. 2 is a block diagram generally illustrating an exemplary environment in which the present invention may operate.

As previously indicated, extensible classes in the CLR of the .NET Framework can be accessed in XML with the invention. Although not required, a brief overview of the .NET framework may be instructive for a better understanding of the benefits provided by the invention. Turning now to FIG. 2, the .NET framework 200 in its most simplest representation consists of the CLR 202, the framework class library 204, a user interface 206, and web services and applications 208. The .NET framework resides on the operating system of the machine such as operating system 134.

The user interface 206 and web services and applications 208 provides for general input/output including file access, XML support, and services. They expose web technology and services from HTTP to HTML, provide user interface elements for building web pages and/or traditional Windows based user interfaces, and exposes ASP.NET and many other services.

The CLR 202 is responsible for managing memory, starting up and stopping threads and processes, and enforcing security policies. It provides a common type system that provides a programming language-independent concept of data types, which enables numerous programming languages to share data and code in the .NET framework. The CLR 202 also has a just-in-time compiler that translates the MSIL (Microsoft intermediate language) code and optimizes it for a specific machine to execute natively on the system processor of the machine.

The framework class library includes classes. A class defines the operations an object can perform (methods, events, or properties) and defines a value that holds the state of the object (fields). Although a class generally includes both definition and implementation, it can have one or more members that have no implementation. The common type system defines how types are declared, used, and managed in the runtime. The .NET framework types use a dot syntax naming scheme that connotes a hierarchy. This technique groups related types into namespaces so they can be searched and referenced more easily. The first part of the full name, up to the rightmost dot, is the namespace name. The last part of the name is the type name. For example, System.Collections.ArrayList represents the ArrayList type, which belongs to the System.Collections namespace. The types in System.Collections can be used to manipulate collections of objects. When classes are organized this way, it is easy to understand the purpose a namespace serves and what class functionality it will contain. For example, System.Web.Services conveys that the classes will provide a service for some kind of Web functionality. Likewise, it is easy to conclude that System.Windows.Shapes provides a service for shapes. In addition to logically grouping classes in easily decipherable, unified classes, namespaces are extensible in that a user can derive her own namespace from an existing one. For example, System.Web.UI.ACMECorp could be derived from System.Web.UI and provide custom UI elements. The framework namespaces provide the "system," or base functionality, and services needed to build and run solutions.

Figure 3:
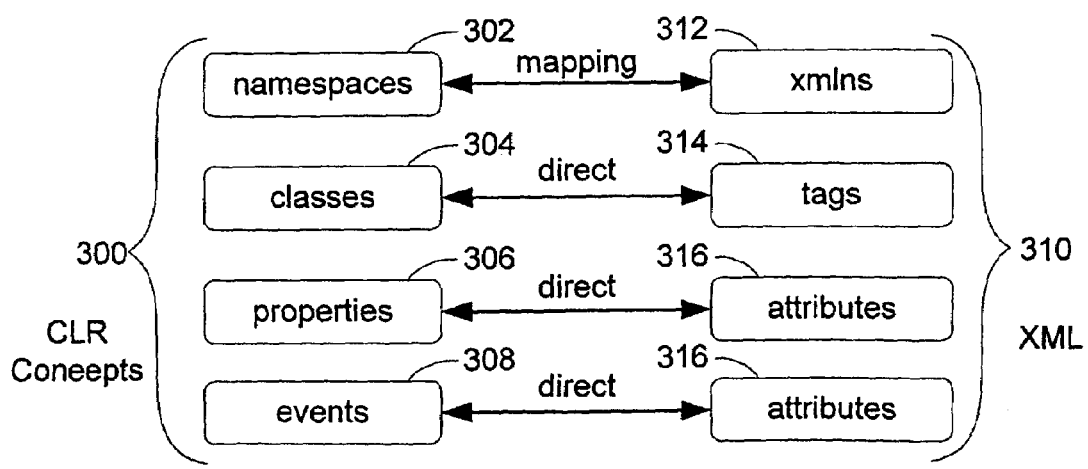
FIG. 3 is a block diagram generally illustrating the mapping between a markup language and the exemplary environment of FIG. 2.

In the description that follows, the invention will be described using a xaml nomenclature to distinguish the features of the invention from XML. Turning now to FIG. 3, the invention provides a direct mapping of CLR concepts 300 to XML 310. Namespaces 302 are found via the xmlns declaration 312 using a CLR concept called reflection. Classes 304 map directly to XML tags 314. Properties 306 and events 308 map directly to attributes 316. Using this mapping, a user can specify a hierarchy tree of any CLR objects in XML markup files.

Xaml files are xml files with a .xaml extension and a mediatype of application/xaml+xml. Xaml files have one root tag that typically specifies a namespace using the xmlns attribute. No specific root tag is required, thereby allowing users to have different CLR associated tags as the root. The namespace may be specified in other types of tags.

A default set of namespaces is used. In one embodiment, five namespaces are used. These namespaces are System.Windows (having classes for elements), System.Windows.Controls (having classes for control elements such as buttons, panels, text panels, etc.), System.Windows.Documents (having classes for document-centric text rendering elements), System.Windows.Shapes (having classes for Windows Vector Graphics elements), and System.Windows.Controls.Atoms (having classes for building block elements such as scroll viewers) and they are specified in the xmlns declaration. Other namespaces may be used and the default set can be application configurable.

As previously indicated, tags in a xaml file generally map to CLR objects. Tags can be elements, compound properties, definitions, or resources. Elements are CLR objects that are generally instantiated during runtime and form a hierarchy of objects. These elements remain in the hierarchy. Some elements are instantiated only when needed. Elements are capitalized in a way that is consistent with the .NET framework. In one embodiment there are five primary sets of elements. These are Panels, Controls, DocumentElements, Shapes, and Decorators. Panels are used to define how the elements on a page are arranged. Examples of Panels include Textpanel, DockPanel, Canvas, FlowPanel, and Table. Controls provide interactive experience. Examples of Controls include Button, RadioButton, and ListBox. DocumentElements are used to render and format flowing text. These elements can be placed inside any element which can contain other elements. Examples of DocumentElements are Paragraph, Section, Bold, and Italic. Shapes are elements of Vector Graphics. Examples of Shapes include Ellipse, Line, and Path. Decorators are like Panel elements, except they can only have one child. Examples of Decorators include Border and Glow.

Compound property tags are used to set a property in a parent tag and are discussed in greater detail below. During runtime, a compound property tag will not be in the hierarchy tree as an element. Definition tags are used to add code into a page and define resources. The definition tags are identified in a xaml page or inside a component of a xaml page as <def:xyz> where xyz is the item being defined. For example, <def:Code> is used to add code into a page and <defiResources> defines one or more reusable resources. Tags that appear inside a <def:Resources> tag can map to any Element or any arbitrary CLR object. The resource tag provides the ability to reuse a tree of objects merely be specifying the tree as a resource. Definition tags may also be defined within another tag as an xmlns attribute.

As previously indicated, attributes map to properties and events associated with classes. Some attributes aren't associated with real CLR classes, so the definition tag is also used to distinguish these attributes from attributes that map to properties or events. The following table lists these attributes.

| Attribute | Description | Value Type | Accepted Values |
| --- | --- | --- | --- |
| def:Language | Specifies the language to use to compile code. This is an attribute of the root tag of an XAML file. | String | C#<br>VB<br>C++<br>JScript<br>J#<br>or other languages |
| def:Class | Specifies the name of the subclass in a markup subclass definition. | String | Just a class name or a namespace and a class name. |

Now that the basic namespace to xmlns attribute, class name to tag name, and property and events to attribute mappings and defined attributes have been described, the steps the invention takes in parsing xaml files will be described. The parser of the invention, which will be called the xaml parser from here on determines from the root tag which CLR assemblies and namespaces should be searched to find a tag. An exemplary root tag is of the form

```
<TextPanel xmlns="http://Microsoft.com/xam/2004/">
Hello World
</TextPanel>
```

The xaml parser looks for a namespace definition file in the URL directory specified by the xmlns attribute. For example, in the exemplary root tag above, the xaml parser will search for the definition file at http://microsoft.com/xarnl/2004/xmlns.definition.

In scenarios where the namespace definition is not at the xmlns location, the <?Mapping?> tag is used in one embodiment. For custom components that have been built into an assembly, a tag is of the form

```
<?Mapping xmlns="foo" Namespace="ACME.Widgets" Assembly="acme" ?>
```

For a namespace where the xmlns points to a site that is controlled by another entity (e.g., w3c.org) where a user provides an implementation, the tag is of the form <?Mapping xmlns="http://www.w3c.org/2000/svg" xmlnsdefinition="http://www.acme.com/svg/2000/xmlns.definition ?> A namespace can also be specified using the form xmlns:foo=http://www.ACME/foo, which defines the namespace "foo." As previously indicated, the namespace may also be specified in other types of tags. For example, a namespace is specified in the MyCoolButton tag below.

```
<TextPanel xmlns="http://microsoft.com/saml/2005"
xmlns:def="Definition"
xmlns:Language="C#">
    <MyCoolButton xmlns="http://Acme.Com/MyControls/2005">
    <MyCoolButton>
</TextPanel>
```

The namespace definition file provides the name of the assemblies and their install path and a list of CLR namespaces. An exemplary definition file is below:

```
<Xmlns Name="Microsoft Xaml2005">
    <Schema Uri="http://microsoft.com/xaml/2005/xaml2005.xsd" I>
    <Assembly Name="System.Windows" Version=" 1.0.0.0"/>
    <Assembly Name="System.Windows.Foo" Version=" 1.0.0.0"/>
    <ClrNamespace Name="System.Windows" I>
    <ClrNamespace Name="System.Windows.Controls" I>
    <ClrNamespace Name="System.Windows.Documents" />
    <ClrNamespace Name="System.Windows.Shapes" I>
</Xmlns>
```

When the xaml parser encounters a new xmlns definition file, the definition file is fetched and stored locally.

When the parser encounters a tag, the parser determines which CLR class the tag refers to using the xmlns of the tag and the xmlns definition file for that xmlns. For example, if the tag is <Text xmlns=" . . . ">, the parser searches for a class called text within the namespace(s) provided in the definition file. The parser searches in the order that the assemblies and namespaces are specified in the definition file. When it finds a match, the parser instantiates an object of the class.

An attribute in a xaml tag is used in one of two ways. It can either be setting a property or hooking up an event handler. For example, the xaml parser interprets the tag below <Button Text="OK" Background="Red"
    Click="RunHandler" ID="b1"> as a class called Button having text, background, and click properties and/or events. The parser searches for the text, background, and click names in the properties section of the Button class. If a name is not in the properties section, the parser looks for the name in the event section.

In the above example, the parser determines that Text and Background are properties and Click is an event. The text string "OK" is set. For properties and events that are more complex than setting text strings, a CLR type converter is used to create an object that converts to and from the string. For example, the property Background is determined to be a CLR type of type Paint. The CLR type converter for the type Paint is used to convert the string "Red" to an object of type Paint. The string is set as the value of the Button's background color. Similarly, the Click event is wired up to the RunHandler method and the ID property is set to b1.

Properties can be set as a simple attribute, a compound property with a string value, or a compound property with an object as the value. A simple attribute is of the form <Button Background="Blue"/>. In this case "Blue" is interpreted by calling the type converter that knows how to convert a string to an object of type Paint (the type of the Background property). It should then be set as the value of the Button's Background property. If the attribute value starts with *, the attribute is not specifying a literal value, but instead is setting the value equal to a newly instantiated object or an existing object.

A compound property with a string value is of the form

```
<Button>
    <Button.Background>Blue</Button.Background>
</Button>
```

The tag with a period in it indicates that the tag is a reference to a property. When the parser sees a tag beginning with the tag name of the parent tag followed by a period (e.g., "Button." in a "Button.Background" tag), it searches for a property specified by the name after that period (e.g. "Background" in a "Button.Background" tag). In this case "Blue" should be interpreted by calling the type converter that knows how to convert a string to an object of type Paint (the type of the Background property). It should then be set as the value of the Button's Background property.

Properties from another class can also be declared in a tag. For example, a tag of <TextBox Button.Background="Blue"> indicates that the attribute Button.Background is mapped to a different class than the TextBox class. The parser sees the period and searches for a property specified by the name after that period (e.g. "Background" in a "Button.Background") in the class specified by the name before the period (e.g., "Button").

A compound property with an object as the value is of the form

```
<Button>
    <Button.Background>
        <HorizontalGradient StartCollor="Blue" Endcolor="White" />
    </Button.Background>
</Button>
```

In this case, the CLR HorizontalGradient object is created and then set as the value of the Button's Background property.

The compound property syntax can be used to provide more than just objects for the value. For example, an Animation or a Bind to some data can be accomplished:

```
<Button>
<Background>
    <ColorAnimation Fromcolor="Blue" Tocolor="SWhite"
        Duration="2" />
</Background>
<Text>
    <Bind DataSource="*Resources.Customers" Path="LastName" />
</Text>
</Button>
```

In these cases, the tags are used to give the Animation or Bind the ability to set up the appropriate systems to provide the feature. For example, after creating the Animation object, the xaml parser queries the object to see if it implemented an interface called IApplyValue. If it did, the xaml parser calls ColorAnimationObject.ApplyValue(elementReference, BackgroundPropertyID). The ColorAnimationObject would then wire up the animation. If the object doesn't support the interface, the xaml parser sets the Background property of the Button to the ColorAnimationObject.

As previously indicated, if the attribute value starts with *, the attribute is setting the value equal to a newly instantiated object or an existing object. The xaml parser looks for the name after the * and looks for a CLR type of the name after the *. For example, with a <Button Background="*HorizontalGradient(Start=Red End=Blue)"> tag, the parser determines the name before the parenthesis (i.e., HorizontalGradient) and does a search for that CLR type in the current namespace established by the preceding xmlns settings. The parser treats the items after the parenthesis as attributes and values (e.g., start is an attribute and red is a value for the attribute). Other examples of using the "*" escape character are below. In all of these cases, the value will be set once. It is not setting up an expression or binding to maintain a relationship between this property and some object. Forward referencing is allowed. During tree creation, if the object referenced doesn't exist yet, the setting of that property is delayed until it does or until the tree is completely created.

```
<DockPanel ID="root" Background="Blue">
<def:Resources>
<HorizontalGradient def:Resouce="hg1" StartColor="Blue" EndColor="White" />
</def:Resources>
<!-- Reference to an another element -->
<HyperLink Target="* frm 1 " >Link</HyperLink>
<Frame ID="frml" />
<!-- Reference to a property on another element -->
<FlowPanel Background="*root.Background" />
<!-- Reference to a page level resource - both are equivalent since root is "this"-->
<Flowpanel Background="*Resources.hgl" />
<Flowpanel Background="*root.Resources.hgl" />
<!-- Reference to the Application object - both are equivalent since root is "this"-->
<Flowpanel Property="*App" />
<FlowPanel Property="*root.App" />
<!-- Reference to a property on the application object -->
<FlowPanel Property="*App.Foo" />
<!-- Reference to an application level resource -->
<FlowPanel Property="*App.Resources.Foo" />
</DockPanel>
```

Programming languages can be associated with a .xaml page in two places. These places are in the .xaml file and in an associated code-behind file. The code-behind files are generally named the same as the .xaml file with the addition of the programming language's typical extension appended to the end. For example, .xaml.cs is used for C#, .xaml.vb is used for VB, and .xaml.js is used for Jscript. A namespace of xmlns:def="Definition" is added to the root element in order to use the tags needed to add code to a page. The user chooses the programming language associated with a xaml page by adding a def:Language attribute to the root element of the page. For example, the following tag shows how the definition and language attribute are added to the root element: <DockPanel xmlns="http://microsoft.com/xaml/2005" xmlns:def="Definition" xmlns:Language="C#" >.

In order to add code within a xaml file that contains">", "<", and/or "&" characters, CDATA sections as defined in XML are required in the <def:Code> section. An example of this is below (note that, in this example, the CDATA bracketing is not required, since the contained code does not use "<", ">", or "&" characters):

```
<TextPanel xmlns="http://microsoft.com/xaml/2005"
    xmlns:def="Definition"
xmlns:Language="C#" >
    <Button ID="buttonl " Click="clicked">Press this</Button>
        <def:Code><! [CDATA[
            void clicked(Element target, ClickEventArgs args)
            {
                buttonl.Text = "Hello World";
            }
        ]]></def:Code>
</TextPanel>
```

In order to specify code in a code-beside file, a source attribute is used. The source attribute provides a URI to the code behind for the xaml file. The URI can be relative or absolute. An example of specifying the URI and a simple code-beside file is below.

```
<TextPanel xmlns="http://Microsoft.com/saml/2005"
smlns:def+"Definition"
smlns:Language="C#">
    <ButtonID="buttonl" Click="clicked">Press this</Button>
        <def:Code Source="Simple.xaml.cs" />
    <TextPanel>
```

The simple code-beside file is below:

```
Simple.xaml.cs
    namespace MyApp {
        using System;
        using System.Windows;
        //more usings here
        partial class Simple:Page {
            void clicked(Object target, ClickEventArgs args)
            {
                buttonl.Text = "Hello World";
            }
        }
    }
```

The xaml parser also supports a feature called ILiteralContent. For objects that implement ILiteralContent, the xaml parser treats the tag for the object as a string and does not parse the tag. For example, if Public class FooObject implements ILiteralContent, then whenever the xaml parser encounters the tag <FooObject>"I am a string"4FooObject>, the parser creates an instance of FooObject and passes the data within the <FooObject> tag (e.g., "I am a string") to the newly created FooObject.

Figure 4:
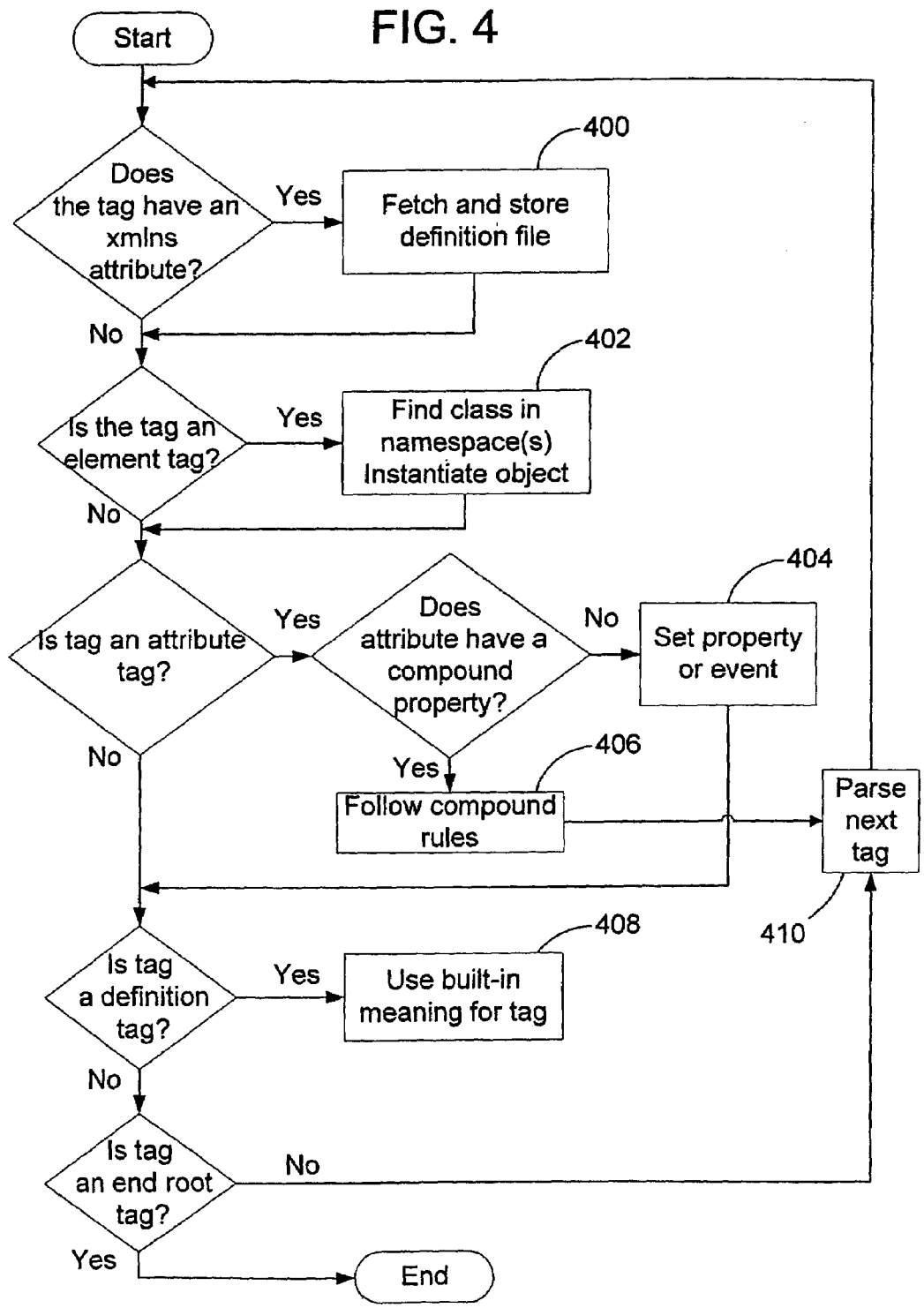
FIG. 4 is a flow diagram illustrating the steps to parse a markup file in accordance with the present invention.

In summary, the following rules are used when parsing the root tag or tags that are directly contained by an element/object. Turning to FIG. 4, if the tag has an xmlns attribute specifying a schema location, a definition file having assemblies/namespaces associated with the xmlns attribute is located and stored locally (step 400). The assemblies/namespaces are generally found using the URL of the schema in the root tag of the document or in a mapping tag. If the tag is an element tag, the parser looks at the appropriate set of assemblies/namespaces for a class of that name based on the xml namespace in which the element is specified and an instance of an object of the class is instantiated (step 402). If a class name isn't found, the xaml parser checks to see if the containing parent has a property of that name. If it is a property of the containing element, the xaml parser parses the content of that tag using the compound property rules. If the tag is an attribute tag, the property or event associated with the attribute is set (step 404). If the attribute value starts with *, the attribute is not specifying a literal value, but instead is setting the value equal to a newly instantiated object or an existing object. Tags may have tags that are used to set a property on a parent tag. The tag is a compound property. If the tag is a compound property, compound rules are followed (step 406). These rules are below. The xaml parser determines if the compound property is a string. If the content is a string, the xaml parser calls a type converter for the appropriate type of the property being set. If the content of the parent tag is another tag, then the xaml parser instantiates the object as normal. After instantiating the object, the xaml parser sets it as the value of the property on the parent object. If the xmlns for the tag is "def:", the xaml parser uses a set of built in meanings as described below (step 408). The next tag in the file is parsed (step 410) and steps 400 to 408 are repeated for each tag until the xaml parser detects the end root tag of the xaml file.

It can be seen from the foregoing that the invention provides a mechanism that allows object models to be represented in an XML based file using markup tags. This ability to represent object models as markup tags can be used to create vector graphic drawings, fixed-format documents, adaptive-flow documents, and application UI. These vector graphic drawings, fixed-format documents, adaptive-flow documents, and application UI can be created asynchronously or synchronously. This provides the benefit that these items can be built from markup to create a tree of objects.

Fixed-format documents are documents that explicitly define in a predetermined device-independent manner the number and size of document pages and the placement of objects on each page. This provides a user with the ability to create and share a document in a format that will render the same pages regardless of the implementation system used to view the document. In one embodiment, one of the root tags for fixed-format documents is <FixedPanel> and pages are specified using <Fixed Page> tags. Within a fixed page, several types of elements can be used. These elements include text, vector graphics, and images. External resources such as fonts and shared images are specified. The tag used for text provides the user with exact control over individual character glyphs and placement for the character glyphs. Additional tags provide the user with control over how text, vector graphics, and images are combined on a page. The xaml parser recognizes the tag for fixed-format documents. As with any other type of .xaml file, the parser determines the CLR namespaces and classes associated with the tags and calls the type converters for the tags within the xaml file and renders a fixed-format document.

An adaptive-flow document does not have a predetermined page size. The set of text, images, DocumentElements, and other objects in an adaptive-flow document can flow or be repositioned on the page in order to adapt to varying page widths. For example, a page rendered in a window on the display screen may be a different width on different display screens, depending on the computing system used or on user preferences. A printed page will have different width depending on the paper size. Lines of text, for instance, will have shorter length if the page width is narrower, causing the text to flow or reposition additional words onto lines further down the page in a cascading sequence from text line to text line. Attributes are used to specify a user's preferences to how the adaptive-flow document appears.

The xaml parser passes these attributes to the CLR type converter for objects to create the document. The objects can create unpaginated or paginated presentations. An unpaginated presentation has a single bottomless page viewed on the display screen with the aid of a control such as a vertical scrollbar. A paginated presentation breaks the document content up into segments based on the page height and shows each page separately, viewed on the display screen with the aid of controls such as next and previous buttons. Further attributes determine the width and number of columns on a page, the sizes for all text elements, text line spacing, sizes and positions for all images or figures, and the widths of margins and gutters. A user also may specify via the attributes whether the objects that create the document should automatically adjust columns, text size and line spacing, image size and placement, margins and gutters, and other page or text parameters, for optimum readability for the page size. The xaml parser parses the tags for adaptive-flow documents, determines the CLR namespaces and classes associated with the tags and calls the type converters for the objects specified within the xaml file for rendering an adaptive-flow document.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable storage medium having stored thereon a markup language data structure, comprising:
   a first data field containing data mapped to a programming language class; and
   a second data field containing data mapped to one of a property and an event in the class, wherein the mapping of the data in first data field to the programming language class and the mapping of the data in the second data field to the property and the event use one or more common language runtime object concepts and one or more extensible markup language files, the one or more common language runtime object concepts comprising a reflection, the reflection utilized to find at least one namespace via an extensible markup language namespace declaration, and wherein the one or more extensible markup language files are used to asynchronously create a plurality of items including at least one or more of the following: user interfaces, vector graphic drawings, fixed-format documents, and adaptive-flow documents.

2. The computer-readable storage medium of claim 1 further comprising a third field containing data indicating a uniform resource locator for retrieving a definition file having at least one assembly and at least one namespace for interpreting the first field and the second field.

3. The computer-readable storage medium of claim 1, wherein if the second data field has a * character, the second data field is set to a value equal to one of a newly instantiated object and an existing referenced object during process of the data structure.

4. The computer-readable storage medium of claim 1, wherein the second data field has stored thereon a compound property and wherein upon processing the second data field, a type converter is called if the second field is a text string.

5. The computer-readable storage medium of claim 4 wherein upon processing the second data field, if the second field is an other tag, a class based on the other tag's name is located, an object of the class based on the other tag's name is instantiated, and the object is set as a value of a property on the tag.

* * * * *

UNITED STATES PATENT AND TRADEMARK OFFICE
CERTIFICATE OF CORRECTION

| | | |
|---|---|---|
| PATENT NO. | : 7,464,329 B2 | Page 1 of 1 |
| APPLICATION NO. | : 11/351649 | |
| DATED | : December 9, 2008 | |
| INVENTOR(S) | : Robert A. Relyea et al. | |

It is certified that error appears in the above-identified patent and that said Letters Patent is hereby corrected as shown below:

In column 14, line 61, in Claim 2, after "and" insert -- the --.

Signed and Sealed this
Tenth Day of May, 2011

David J. Kappos
*Director of the United States Patent and Trademark Office*